July 20, 1943.   G. A. JULIUS ET AL   2,324,778
INTEGRATING AND TOTAL DISPLAYING MECHANISM FOR TOTALIZATORS
Filed March 24, 1941   10 Sheets-Sheet 10

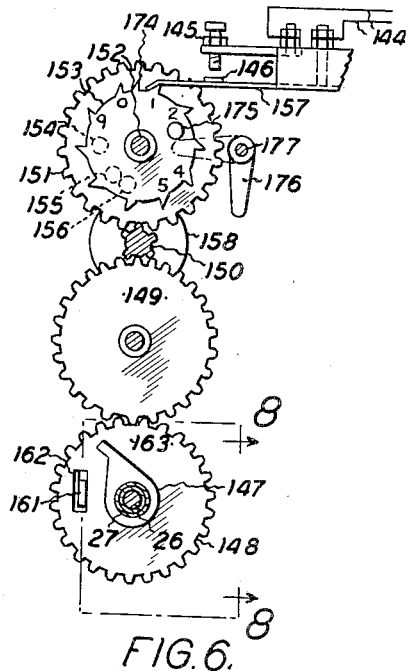
FIG.6.
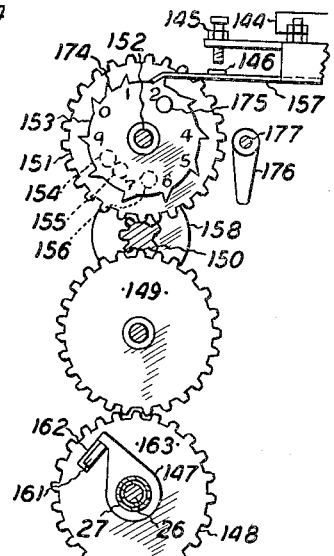
FIG.7.
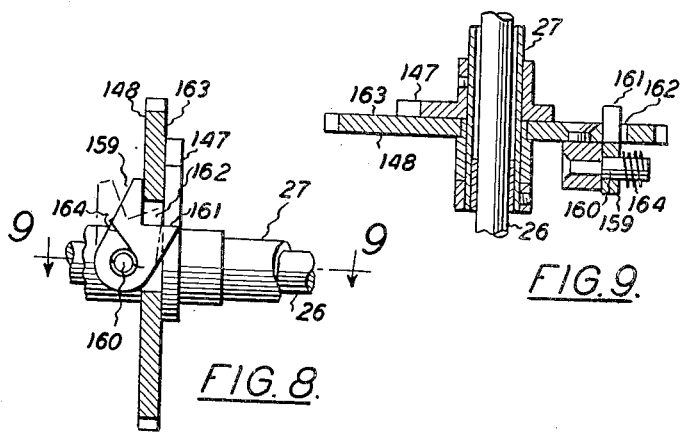
FIG.8.
FIG.9.

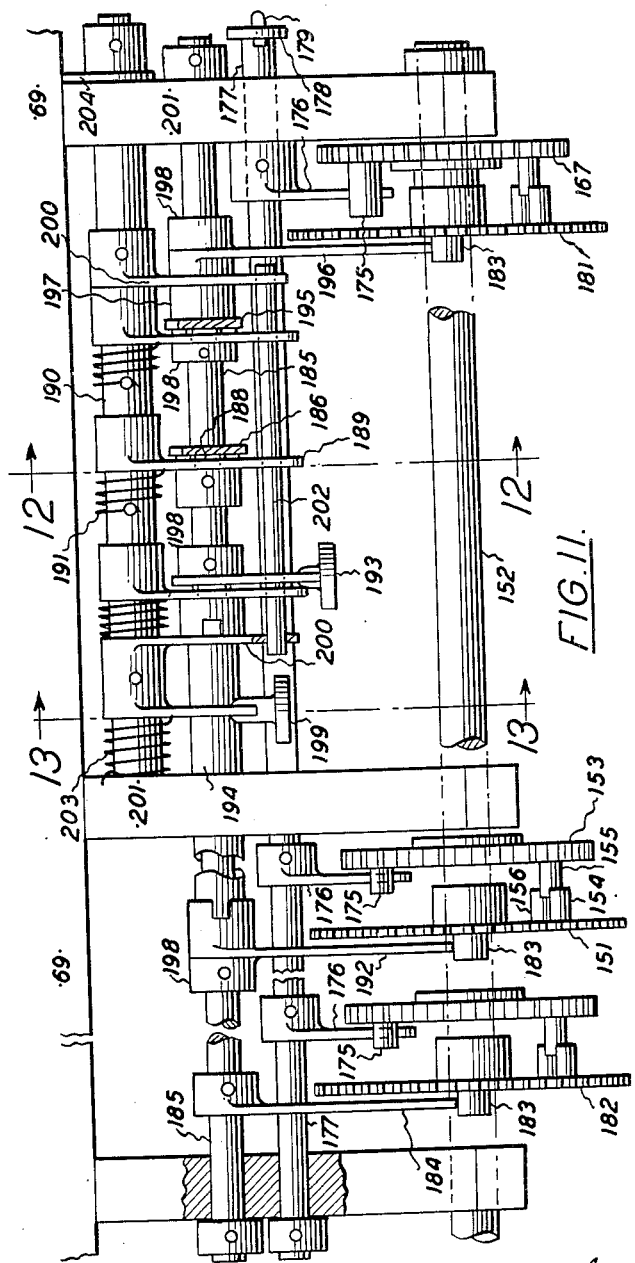

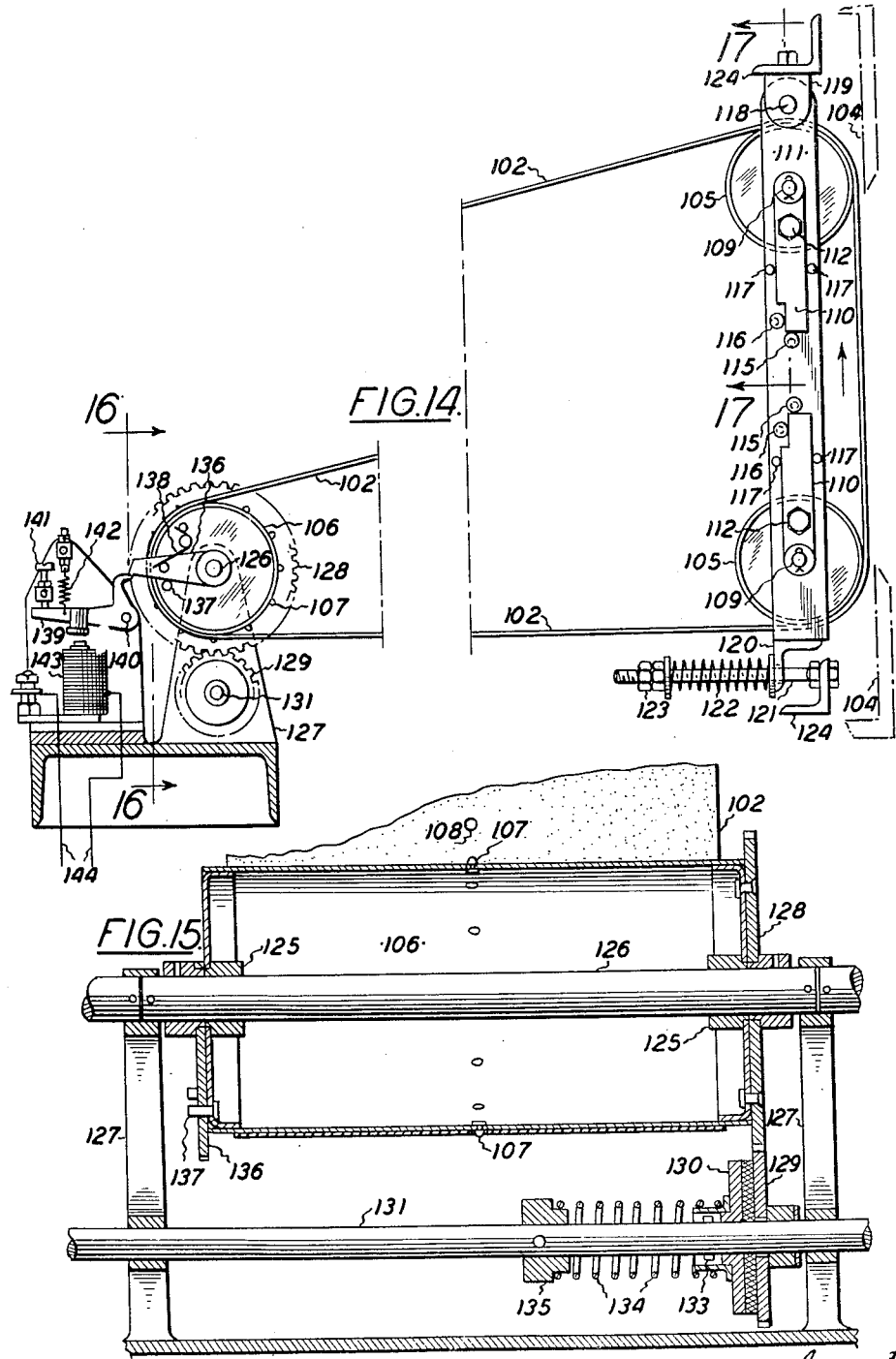

Inventors:
G. A. Julius and
A. F. Julius
by E. F. Wendroth Atty

Patented July 20, 1943

2,324,778

UNITED STATES PATENT OFFICE 2,324,778

INTEGRATING AND TOTAL DISPLAYING MECHANISM FOR TOTALIZATORS

George Alfred Julius and Awdry Francis Julius, Sydney, New South Wales, Australia Application March 24, 1941, Serial No. 384,997
In Australia April 26, 1940

11 Claims. (Cl. 177—351)

Totalizators of the class used in connection with race betting transactions customarily include mechanism whereby all the transactions effected at several ticket issuing stations in respect of a particular competitor are summed into a single total, and whereby that total is prominently displayed for the information of the investing transactors. As a consequence, totalizators of the class referred to include a number of separate integrating and total indicating or displaying mechanisms each of which consists of an "adding unit" and a "display unit" and each of which deals exclusively with transactions effected in respect of a particular competitor. This invention is primarily directed to such a mechanism.

The ultimate object of the present invention is the provision of integrating and total displaying mechanism, which is of greater service to the investing transactor than has been the case heretofore, in that by its use displayed totals may be read from greater distances, and the figures are exhibited in a manner which minimizes likelihood of an incorrect reading being made, and which facilitates estimation, computation, and generally the extraction of information as to volume flow and trends of betting.

This object is achieved by employing total-indicating display figures of a large type size, by displaying blank spaces instead of zero ciphers in those figure spaces of a magnitude in excess of the actual total at any particular stage in the betting, and by the display of totals in terms of "round numbers" instead of actual total numbers while betting is in progress.

The achievement of the object of the invention in the manner just stated gives rise to several problems, and it is in the provision of practical mechanism to overcome those problems that the present invention consists. For example, heretofore a practical limit to the size of display figures which might be employed, has been imposed by the inertia disability inherent in mechanism designed to progressively display on a large scale a rapidly expanding total at the same rate as that at which additions are made to that total. According therefore, to the present invention, means are provided whereby large size display figures are moved at any selected low speed, without failing, at all times of operation, to exhibit a total which may be unaccompanied by non-significant ciphers and which has absolute accuracy or "round number" accuracy as required.

A known form of adding unit whereby transactions effected by several ticket issuing machines in respect of a single competitor are integrated, includes a small total indicator consisting of a number of separate closely positioned coaxial drums. These drums carry numbers on their peripheries and the first of them is a "units" drum, the second a "tens" drum, and so on, the number of drums being sufficient to display a maximum total number which is large enough to exceed the maximum number of betting units comprising the transactions likely to be effected, in practice, in respect of a single competitor. A betting unit is a selected smallest monetary amount capable of constituting a single transaction, and transactions involving greater amounts are summed as multiples of the betting unit on the mentioned small total indicator. In one form of adding unit in terms of which part of the present invention will be herein described, the number of drums in the small indicator is five, the maximum number of betting units which may be represented thereby being 99999. The progressive totals shown on the small indicator or numbers correlated therewith are continuously transferred to a large total indicator forming a part of the display unit.

The invention will now be described with reference to the accompanying drawings, in which.

Figure 3:
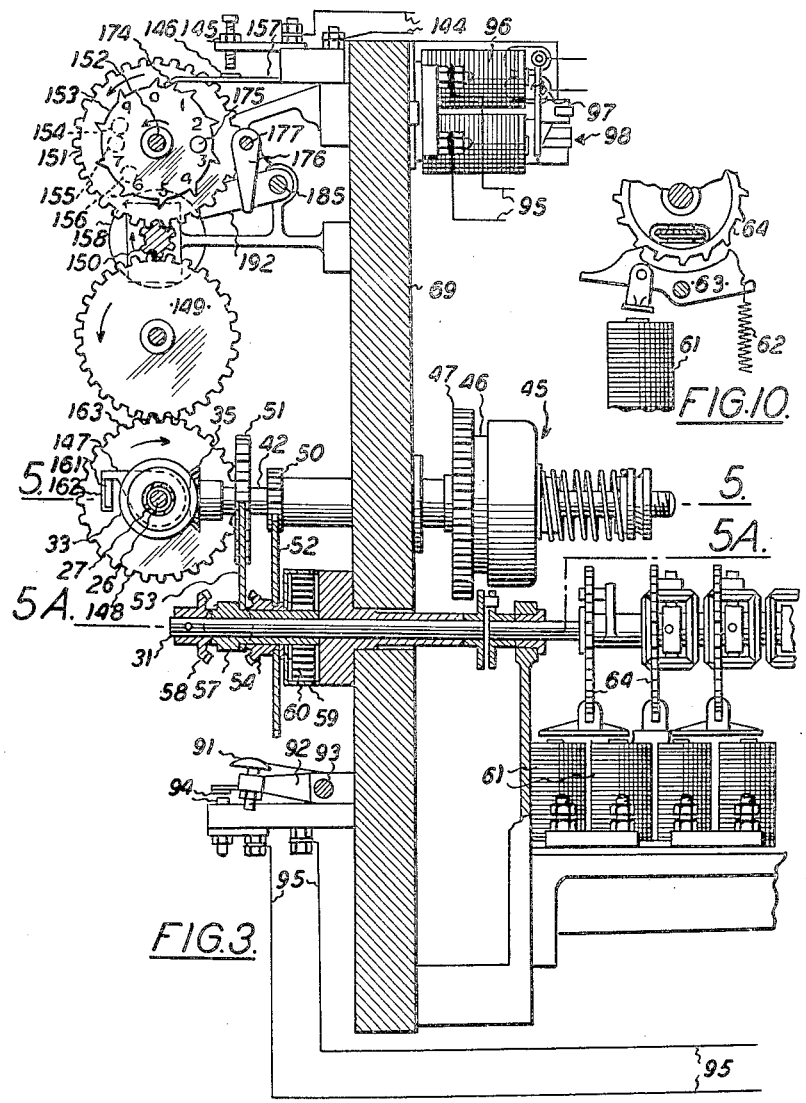
Fig. 3 is a sectional side elevation taken mainly on line 3—3 in Fig. 1.
Figure 12:
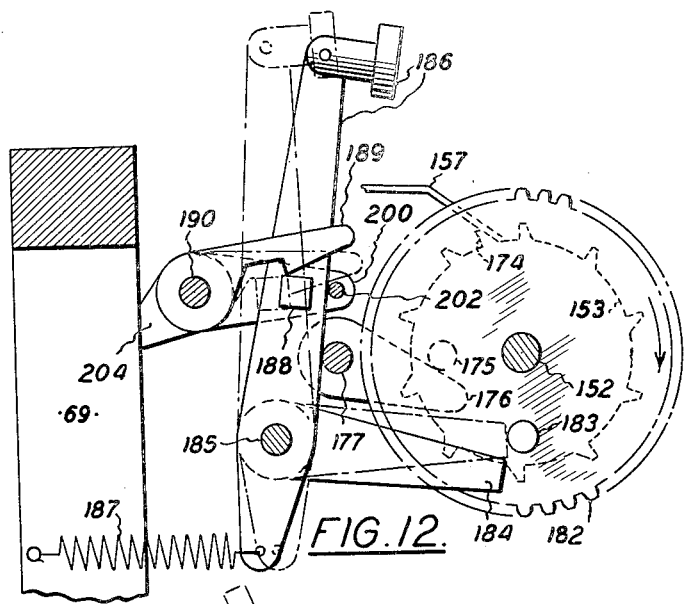
Figure 13:
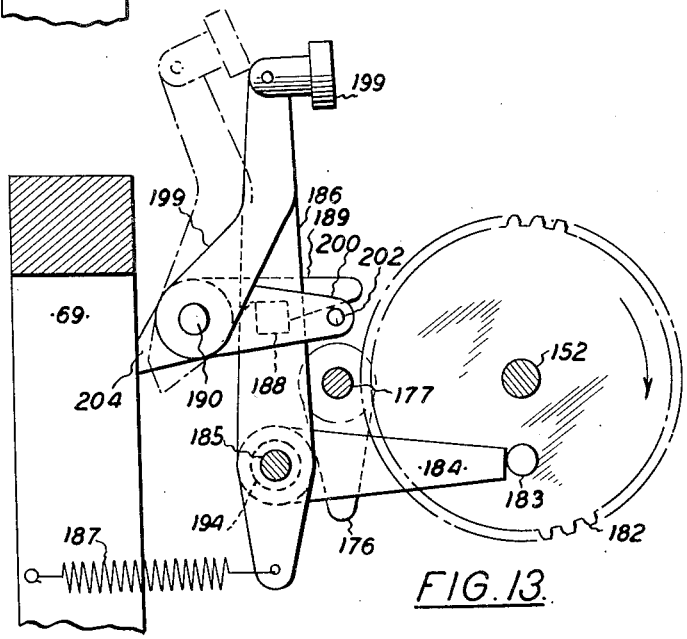

Figs. 6 and 7 repeat a portion of Fig. 3, showing certain integers in operatively consecutive positions;

Fig. 8 is a section taken on line 8—8 in Fig. 6;

Fig. 9 is a section taken on line 9—9 in Fig. 8;

Fig. 10 is a detail side elevation of an electromagnetically operable escapement, numbers of which are employed in conjunction with the mechanism subject of the present invention;

Fig. 11 is an incomplete plan of the adding unit;

Figs. 12 and 13 are schematic sectional views mainly projected from lines 12—12 and 13—13 respectively in Fig. 11;

Fig. 14 is a broken end elevation of the display unit;

Fig. 15 is a medial section through a drive pulley forming a part of the display unit.

Figure 16:
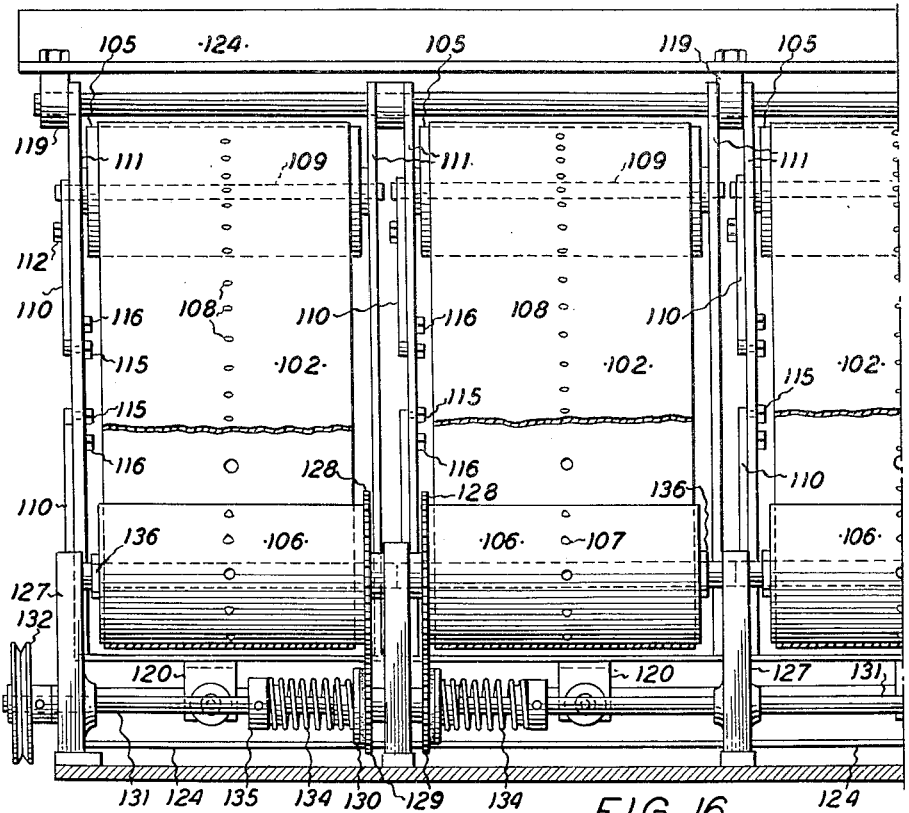
Figure 17:
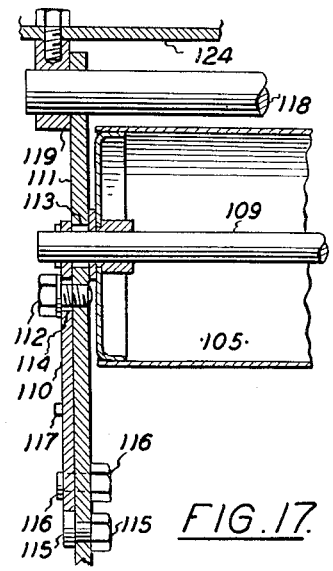

Fig. 16 is an incomplete rear elevation taken on line 16—16 in Fig. 14;

Fig. 17 is a sectional detail taken on line 17—17 in Fig. 14; and

Figure 18:
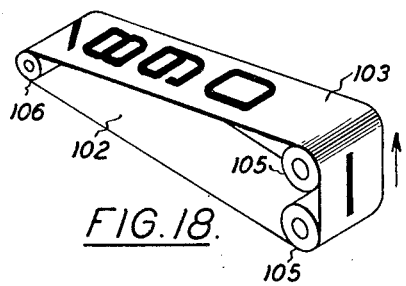

Fig. 18 is a diminutive perspective view of a large indicator figure element which takes the form of a number display belt.

Figure 1:
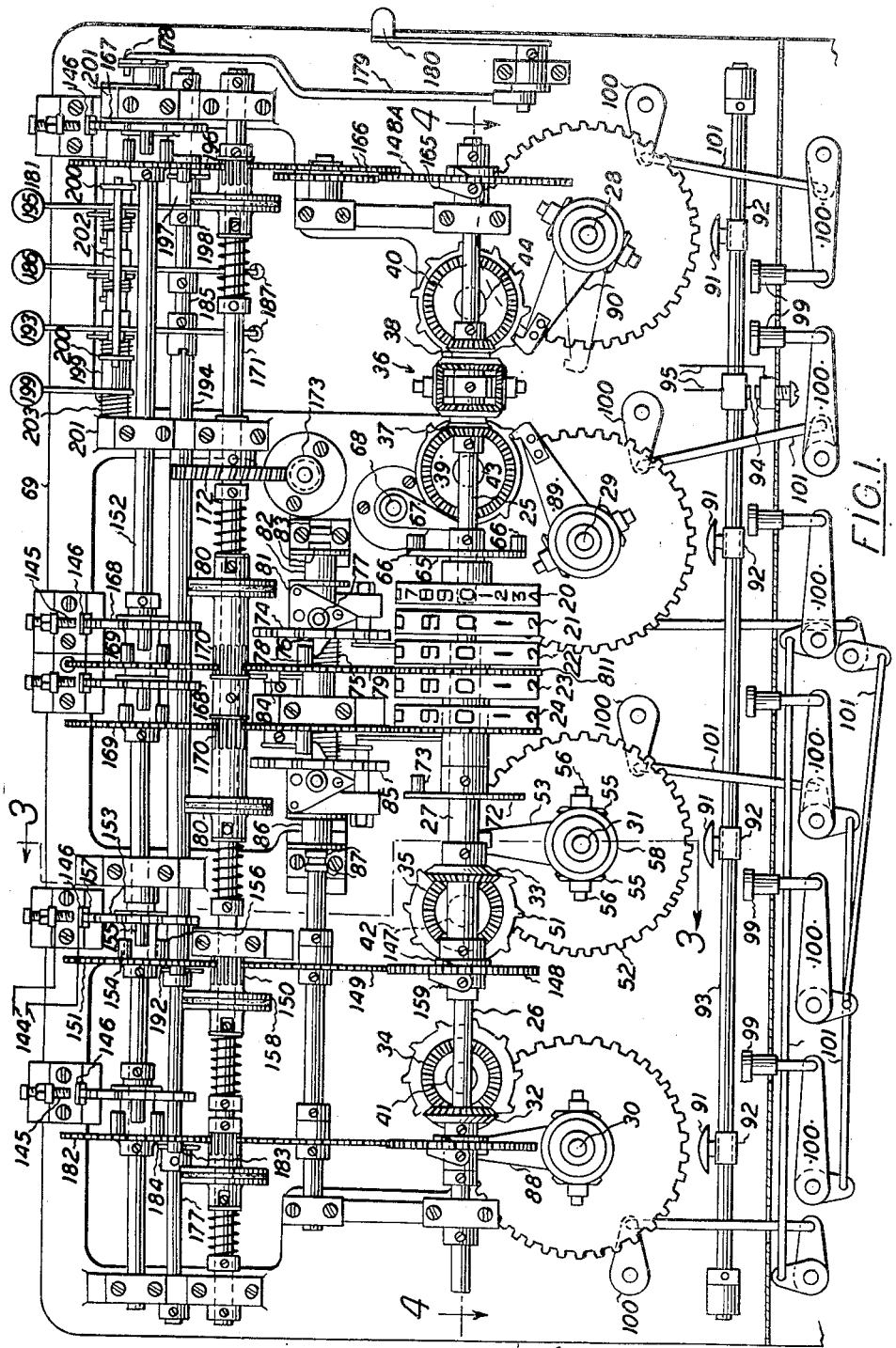
Fig. 1 is a front elevation of an adding unit.

Figs. 5, 8, 9 and 11 to 13 are drawn to an enlarged scale by comparison with Fig. 1, and Figs. 15 and 17 are drawn to an enlarged scale by comparison with Fig. 14.

The small indicator in the adding unit consists of a plurality of counting elements comprising a units drum 20, tens drum 21, hundreds drum 22, thousands drum 23 and a ten-thousands drum 24. Drums 20, 21 and 22 are respectively fixed on shafts 25, 26 and tubular shaft 27. Drums 23 and 24 are freely revoluble on shaft 27. Drums 21 to 24 each bear ten numerals (from 0 to 9) and consequently have ten halting positions relative to a sight frame (not shown) and drum 20 has two such series of numerals in order that its rotative speed may not be excessive.

Transactions in terms of betting units are summed on the small indicator through the agency of electrical impulses due to the operation of the ticket issuing machines and the consequent delivery of tickets therefrom. The electrical impulses energize electromagnets whereby escapements corresponding to the values of the tickets issued are operated to enable rotation of escapement shafts which in turn enable the appropriate small indicator drum shafts to be rotated. There may be one or more escapement shafts to each drum shaft and there may be one or more escapements associated with each escapement shaft, suitable differential or epicyclic gear trains being provided, where necessary, to summate or converge all of the transactions of a particular order (e. g. units or tens) into the appropriate small indicator drum shaft.

In the illustrated arrangement there are two units escapement shafts 28 and 29, one tens escapement shaft 30, and one hundreds escapement shaft 31. Consequently only transactions not in excess of one hundred betting units each may be dealt with by the adding unit shown.

The drum shafts 26 and 27 carry fixed bevel pinions 32 and 33, which mesh bevel gears 34 and 35 respectively. The units drum shaft 25 carries an epicyclic "box" 36 having pinions 37 and 38 which mesh bevel gears 39 and 40. The box 36 is of known construction, and it sums the motions of gears 39 and 40 into the shaft 25.

Figure 4:
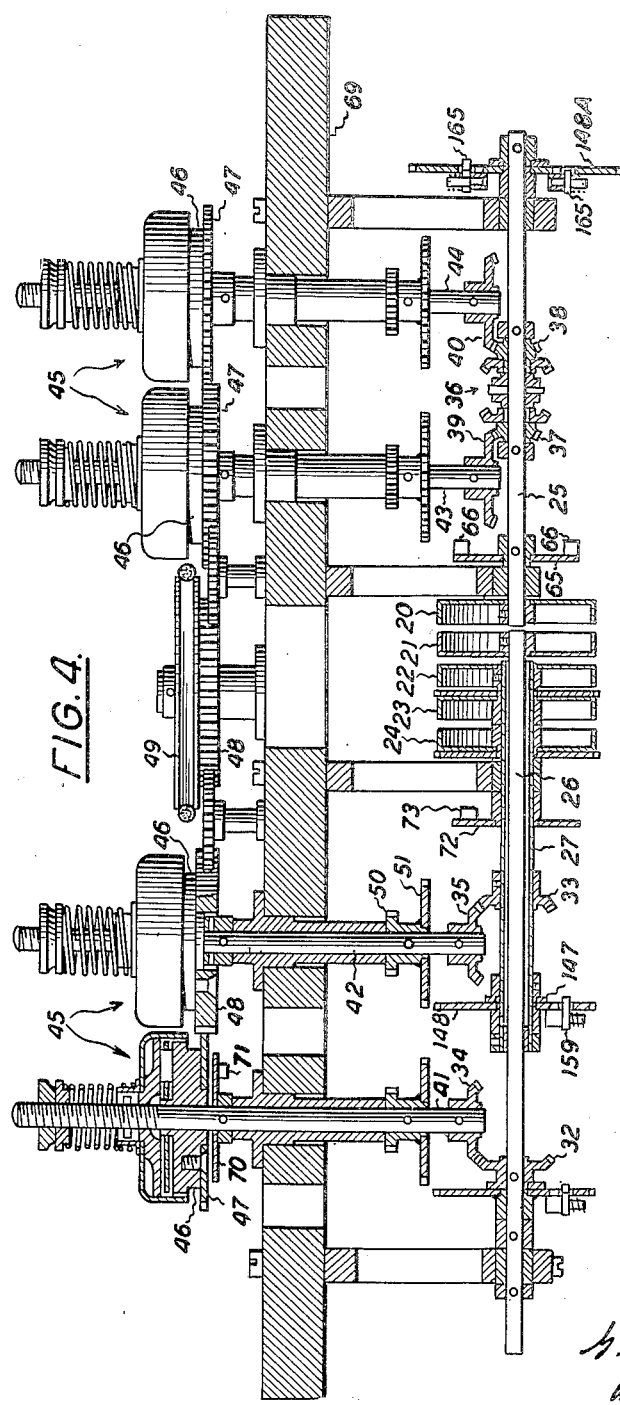
Fig. 4 is an incomplete sectional plan taken on line 4—4 in Fig. 1.

While the adding unit is operative the gears 34, 35, 39 and 40 (see particularly Fig. 4) are continuously urged to rotate, but are enabled so to do only when released by the escapements in the manner described later herein. The gears 34, 35, 39 and 40 are keyed on drive shafts 41 to 44. Each of these shafts has the driven element of a slipping clutch (45) keyed thereon. The clutch driving elements 46 are fixed to gears 47 which are drive connected to a main gear 48 furnished with means—such as pulley 49—for the continuous rotation thereof by a prime mover.

The means whereby the issuance of tickets causes the escapements to govern the ability of the clutches 45 to rotate the bevel wheels 34, 35, 39 and 40 will now be described. The mechanism is the same for each of the wheels 34, 35, 39 and 40, and therefor only the mechanism associated with one of those wheels need be described.

Figure 5:
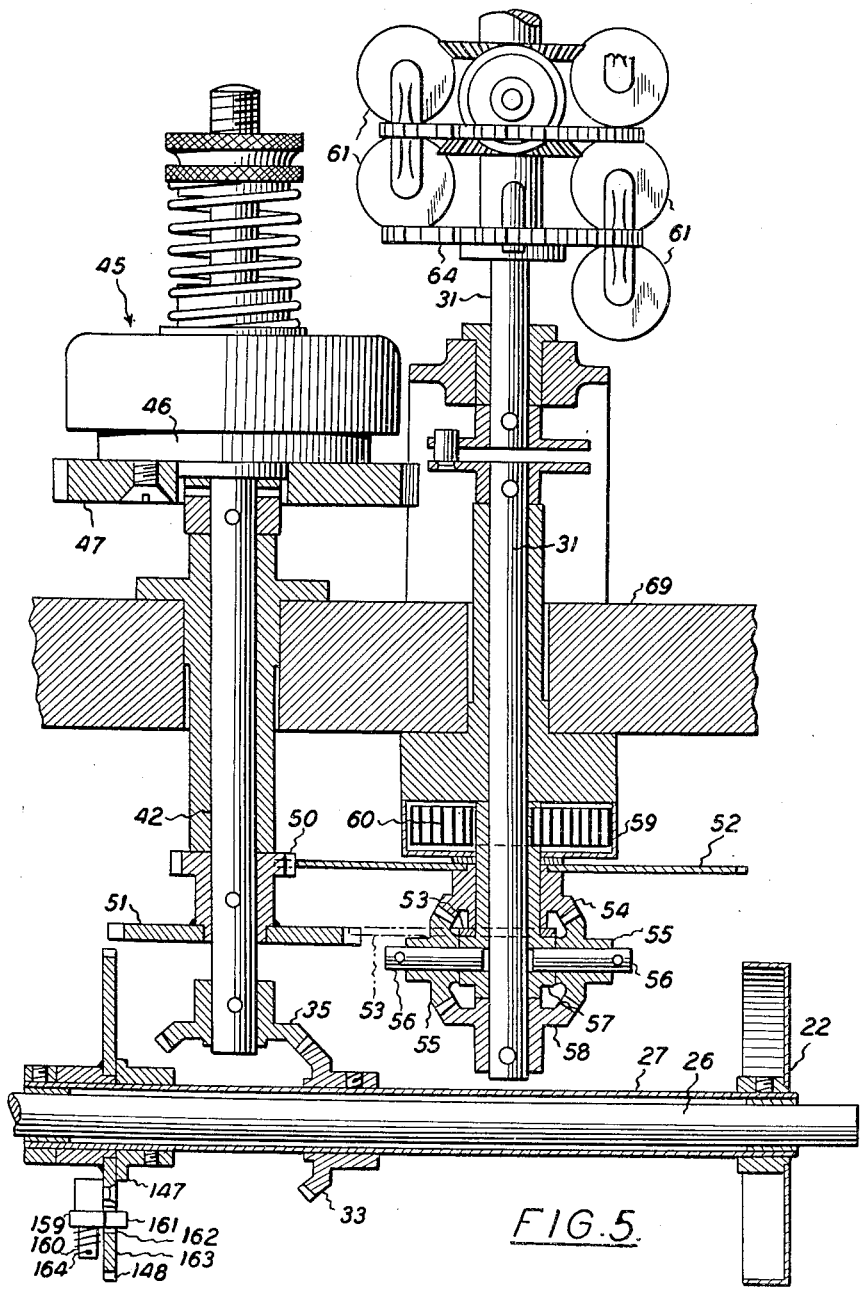
Fig. 5 is a schematic sectional plan taken partly on line 5—5 and partly on line 5A—5A in Fig. 3, for the purpose of illustrating the inter-operation of certain integers situated at those two levels.

Referring mainly to Fig. 5, the shaft 42 has a gear pinion 50 and a ratchet wheel 51 fixed thereon. Pinion 50 meshes a wheel 52, and wheel 51 is adapted for engagement by a stop arm 53 (see also Figs. 1 and 3). The wheel 52 is fixed to the boss of a sun-wheel 54 which is freely revoluble on a sleeve 57. A pair of planet wheels 55 are mounted on short spindles 56 borne in the sleeve 57 which latter is not fixed on the shaft 31. The companion sun-wheel 58 is fixed on shaft 31 and the stop arm 53 is fixed to the sleeve 57. The sleeve 57 projects into a stationary casing 59 which houses a clock spring 60. The inner end of this spring is anchored to the sleeve, and the outer end is secured to the casing 59.

When a ticket is issued (in the present instance a ticket representing one hundred betting units) an appropriate pair of electromagnets 61 is momentarily energized (see also Fig. 10). This energization, in conjunction with tension spring 62, effects a complete oscillation of the escapement lever 63, thus allowing the escapement wheel 64 to rotate through an angle corresponding to one tooth pitch and halting it after that movement. The energy for this part rotation is supplied by the spring 60 exerting through sleeve 57, shafts 56, planet wheels 55, sun-wheel 58 and shaft 31. The movement of sleeve 57 causes the stop arm 53 (which up till now has prevented rotation of wheels 51, 50 and hence 52 and 54), to move away from wheel 51 thus enabling the clutch 45 to turn the wheel 35. By this time the escapement lever has halted the wheel 64 (and hence shaft 31 and wheel 58), and the rotation of wheel 50 turns the wheel 52 so that the spring 60 is rewound to its former tension and the stop arm 53 is brought back into engagement with ratchet wheel 51 thereby halting it until such time as the shaft 31 is again actuated by energization of one of the escapements associated therewith. The net result of the motions just described is that the hundreds drum 22 has been moved through one-tenth of a revolution thus registering the single transaction consisting of one hundred betting units. An important duty of the stop arms such as 53 is that by engaging the teeth on wheels such as 51, those wheels are brought to rest in precise positions which ensure that the numbers indicated by the corresponding drums such as 22 are accurately registered with the sight frame (not shown) thereby minimizing likelihood of misreadings, and accurately positioning the drums for further functions described later herein.

It will be noted that it is only the units, tens and hundreds drums (20, 21 and 22 respectively) which are turned directly in response to energizations of the magnets such as 61, and that it is necessary for a count of ten on any one drum to be transferred as one tenth of a revolution to the drum of next higher order. The means whereby the transfers just referred to are effected are more or less well known in the totalizator art, but a brief description thereof is given below in order that the manner of performance of the invention may be fully manifested.

The units drum shaft 25 (see mainly Fig. 1) has a plate 65 fixed thereon. This plate carries two pegs 66 which on rotation of the plate, sidewardly displace a spring loaded finger 67 keyed on shaft 68. This shaft is furnished with suitable linkage (not shown) at the back of the adding unit frame 69, whereby the movement of the shaft mechanically depresses the tens escapement lever, so that for each half revolution of drum 20 the tens drum 21 is rotated through one-tenth of a revolution. The hundreds drum receives a tenth revolution for each complete revolution of the tens drum in like manner to that just described, although in this case the plate 70 (which corresponds to plate 65) has only one peg 71 (see Fig. 4) and it is keyed on the tens drive shaft 41 instead of the tens drum shaft 26. The hundreds drum shaft 27 has a plate 72 keyed thereon. This plate has a peg 73 (see Fig. 1) which depresses an escapement lever (not shown) whereby an escapement wheel 74 is allowed to rotate through one-tenth of a revolution due to the motive force of a spring 75. The wheel 74 has a trip 76 hinged thereon at 77 and when the wheel 74 is rotated, the trip 76 leaves a peg 78 on gear wheel 79. Gear wheel 79 is continuously urged to rotate by slipping clutch 80, and when the trip 76 moves away from peg 78, gear wheel 81l and with it the thousands drum 23, are moved through a tenth of a revolution, by which time the peg 78 is again halted by the trip 76. The overtaking movement of the wheel 79 rewinds the spring 75 to its former tension. In the event of the trip 76 outstripping the following peg 78 to such an extent that the trip 76 is almost a complete revolution ahead, the rear edge of the trip overtakes and contacts the peg 78 so that the trip is displaced from the position shown in Fig. 1 (in which it is normally held by a light spring, not shown) and moves about its hinge 77 thereby causing its heel 81 to move an endwisely slidable reel 82 which in turn causes a pair of spring contacts 83 to touch each other. These contacts and the purpose thereof will be referred to later herein. The wheel 79 has a peg 84 thereon which is associated with a bell-crank lever whereby an escapement wheel 85 enables a one-tenth revolution of ten-thousands drum 24 for each complete revolution of the thousands drum 23. This movement of the ten-thousands drum is performed in the same way, and by similar mechanisms, as those just described with respect to the thousands drum 23. The escapement wheel 85 has a reel 86 and contacts 87 which are identical to those numbered 82 and 83.

Automatic cut-out mechanism is provided to halt issue of tickets and to ensure against failure to record transactions made up to the point of cut-out, in the event of any breakdown in the adding unit. Such a breakdown may be due to failure of the drive mechanism whereby main gear wheel 48 is rotated, or to one of the slipping clutches 45 failing to transmit driving motion when called upon.

In the event of such a failure one or more of the drive shafts 41 to 44 will stop, or slow down sufficiently so that the one or more corresponding stop arms 53, 88, 89 and 90 (see Figs. 1 to 3) will move away from the corresponding ratchet wheel or wheels such as 51, as indicated in dotted lines in the case of stop arm 90. As the stop arms descend, they approach buttons 91 and eventually one of those buttons is depressed by a stop arm. The buttons 91 are mounted on crank arms 92 fixed on a rock shaft 93. When one of the buttons is depressed the two contacts 94 touch each other.

Figure 2:
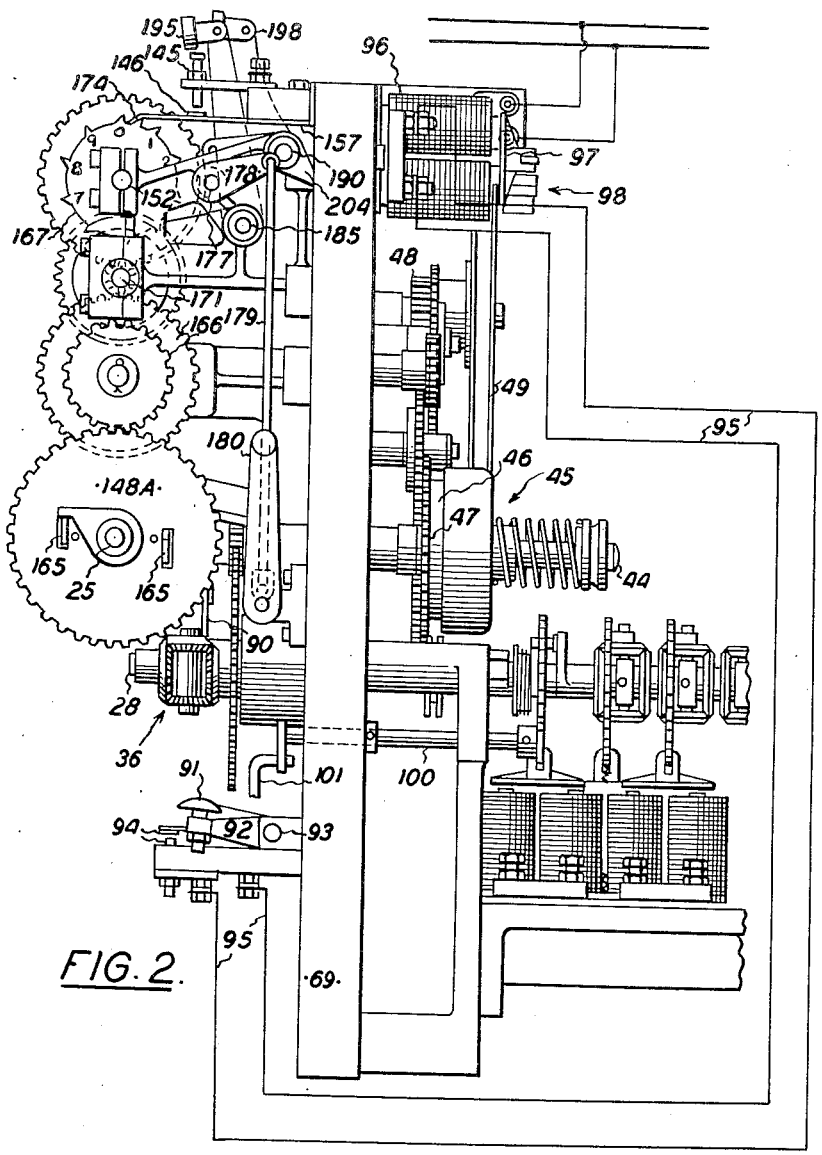
Fig. 2 is a side elevation projected from Fig. 1.

Touching of the contacts 94, 83 or 87 effects closure, through conductors such as 95, of a circuit which includes electromagnets 96 (Fig. 2). Energization of magnets 96 attracts armature 97 which forms part of a trip switch (indicated at 98). Movement of the armature towards the magnets 96 opens the switch, which thus breaks the circuit for all of the escapement magnets, and as the releasing of the ticket issuing machines (as is customary) is effected by a magnet which is wired in series with the escapement magnets, the issuing machines are unable to function for the time being. The trip switch 98 may be provided with a making contact whereby an alarm circuit is closed. The alarm may be in the form of a bell or a red lamp (one for each adding unit) which when its circuit is closed is illuminated on or adjacent the faulty adding unit. When the fault has been remedied the stop arms will return to the wheels such as 51 thereby registering on the counting drums the transactions which occurred just before the stop arm actuated the cut-out.

Means are included in the adding unit for resetting the small indicator drums 20 to 24 to zero, prior to commencement of a series of transactions. The resetting means are of known type and comprise spring returned manually depressible buttons 99 (Figs. 1 and 2) furnished with bell cranks 100 and links 101 whereby the escapements governing the movements of the drums 20 to 24 may be operated.

The above description sets forth the manner and mechanism whereby the small indicator counting elements are actuated to display a series of significant figures, whether as a complete or interim total count of betting units, or as a result of operation of the resetting means.

Whatever the series of significant figures may be, and irrespective of the manner in which they enter into registration with the small indicator sight frame, it is necessary that they be continuously transferred to the figure elements of the large total indicator in the display unit, for the information of investing transactors and prospective transactors. Hitherto all of the large indicator figure elements have been operated directly under the control of the small indicator elements, in such manner that the movements of the former are an exact kinetic reproduction of those of the latter. This practice (especially when the type size of the large indicator figures is required to be larger than has been customary heretofore) results in the inertia disabilities referred to earlier herein. These disabilities are not encountered in the actuation of the thousands and ten-thousands figure elements of the large indicator, as those elements are relatively slow moving even when the betting flow is of large volume; consequently in the presently described practical application of this invention it is not proposed to drive the figure elements otherwise than in strict correspondence with the corresponding counting elements in the small indicator.

According to the illustrated arrangement of the invention, the large indicator figure elements (Figs. 14 to 18) are flexible endless belts 102 whereon the figures of required type size are inscribed. These belts carry numbers of from 0 to 9 and as well one blank space (103) and they are mounted behind a frame 104 having figure windows therein. The number of belts is equal to the number of counting elements (20 to 24—Fig. 1) in the small indicator forming part of the adding unit. Guide pulleys 105 are provided for the belts 102, which are sized and spaced so that the belts present a flat surface to the window apertures, and said belts run over drive pulleys 106 which are preferably equipped with teeth 107 to engage orifices 108 in order to impart positive drive to the belts.

The guide pulleys 105 are mounted on axles 109 supported at one end in bearing plates 110, and at the other end in frame bars 111. These plates 110 are secured to the frame bars 111 by set screws 112. The axles 109 pass through clearance holes 113, in the frame bars 111, and the set screws 112 pass through clearance holes 114, in the plates 110. This provision enables delicate adjustment of the pulleys 105, by means of eccentric headed pins 115 and 16. Pins 115 enable slight endwise adjustment of the plates 110 between fixed guide pins 117, and pins 116 enable slight rotational adjustment about a point in the region of pins 117. The frame bars 111 are capable of limited radial movement about a shaft 118 in bearings 119, and the two bars 111 in each related pair thereof are adjoined by a cross bar which carries a lug 120 having one or more bolts 121 passing loosely therethrough. The belts 102 are maintained at an even tension by springs 122 sleeved on bolts 121 between nuts 123 and lugs 120. The bolts 121 and the bearings 119 are secured to fixed frame members 124.

The drive pulley assemblages are similar, and hence only one of them need be described. Each drive pulley 106 (see Figs. 14 and 15) is mounted on sleeves 125 which are freely revoluble on a shaft 126 secured in pedestals 127. At one end the pulley carries a gear wheel 128 which meshes a pinion 129. Pinion 129 forms the driven element of a slipping clutch whereof the driving element 130 is mounted on a shaft 131 which is common to all of the drive pulley assemblages and which, while the mechanism is operative, is rotated continuously at any selected low speed by a prime mover through the agency, for example, of a pulley wheel 132 (Fig. 16). The driving element 130 is compelled to rotate with shaft 131 by reason of keys 133, and is thrust into contact with the driven element 129 by a compression spring 134 positioned between it and an abutment 135.

At its other end, the pulley 106 carries a stop 136 which is normally held against a pin 137 by a cushioning buffer spring 138. A latch 139 pivoted at 140 is normally retained in the position shown in Fig. 14, against an adjustable stop 141, by tension spring 142, thereby preventing rotation of the pulley 106. The latch 139 constitutes the armature of an electromagnet 143.

Upon energization, the magnet 143 momentarily withdraws the latch 139 from the stop 136 thus enabling the slipping clutch to rotate the pulley 106 until the stop again contacts the latch. For convenience, the diameter selected for the pulley 106 is such that one complete revolution thereof moves its associated belt 102 through a distance equal to the pitch at which the figures are spaced upon the belt.

From the foregoing it will be seen that each belt 102 is actuated to display a next consecutive figure on every occasion when its associated electromagnet 143 receives an energizing impulse. The several electromagnet circuits (indicated at 144) each include a switch comprising a pair of contacts 145 and 146 (see Figs. 1 to 3, 6 and 7). Closure of these switches is governed by movements of the corresponding drums (20 to 24) in the small indicator, in such manner (referred to later herein) that the numbers displayed by the two indicators are the same.

Where the figures on the belts 102 (and consequently the belts themselves) are of large size, it is not mechanically practicable to operate the units, tens or hundreds belts at speeds which keep pace with those of the drums 20 to 22 in the small indicator. It is therefore necessary to provide means whereby the small indicator drums are enabled to overrun or outstrip the drive mechanism whereby repetitive closures of the contacts 145 and 146 is effected. It is also necessary to ensure that, notwithstanding the inclusion of the over-running means just referred to, the large indicator belt drive mechanisms will be so controlled or intermittently released that the belts will display a total which is the same as that on the small indicator, whenever betting ceases or lulls sufficiently for the large indicator belts to halt or move slow enough for readability.

The over-running releases or control mechanism associated with the units, tens and hundreds drums are similar, hence only one need be described.

The hundreds drum shaft 27 (on the adding unit) has a release wiper blade 147 keyed thereon. This blade lies against the side face of a spur gear 148 which is freely revoluble on the hundreds shaft and meshes an idler wheel 149 which in turn meshes a driving pinion 150. This pinion meshes with a driven gear wheel 151 which is freely mounted upon a shaft 152, and which is adapted to drive a ratchet shaped cam wheel 153 also freely mounted upon the shaft 152. Drive is transmitted to wheel 153 by wheel 151 through the agency of a peg 154 on wheel 151, which bears on a peg 155 fixed on wheel 153. An extra peg 156 is provided on wheel 151 which prevents wheels 153 and 151 from becoming greatly out of phase while not preventing slight relative rotation between them. The follower for the cam wheel is a spring leaf 157 upon which the contact 146 is fixed. The arrangement is such that upon rotation of the ratchet cam wheel 153 each of its teeth effects a closure of the hundreds magnet circuit by causing the related contacts 145 and 146 to touch each other.

The hundreds driving pinion 150 is attached to or forms part of the driven element 158 of a slipping clutch which continuously urges the pinion to rotate at a preselected slow speed, but is unable to do so until the gearing meshed therewith is released. The spur gear 148 which is freely revoluble on the hundreds drum shaft, carries a release ratchet pawl 159 pivoted thereto at 160. This pawl has a tail 161 which normally projects through an orifice 162 and beyond the gear side face 163, and at all times is influenced to so project (as shown by full lines in Fig. 8) by a spring 164. The release pawl is so shaped and arranged that the release wiper blade 147 which lies in contact with the gear side face 163, is enabled to depress and pass the pawl tail 161 when its movement relative to the gear 148 is an overtaking one; but when the wheel 148 is rotating at a greater speed than the wiper 147 it (the wheel 148) is slowed down to the same speed as the wiper owing to the pawl remaining in abutment with the said wiper. This means that the wiper blade 147 which rotates at the same speed as the hundreds drum 22, may frequently overtake and pass the pawl tail on the adjacent gear wheel 148. This gear wheel (and consequently the ratchet cam wheel 153) is enabled to rotate only at the slow speed imparted thereto by the drive pinion 150, but when the wiper blade halts or slows down sufficiently, the pawl tail on the gear 148 "catches up" with the wiper, and being unable to pass it remains in contact therewith until it (the wiper) starts or races again. When the pawl tail is contacting the wiper, the pawl's gear wheel 148 (and hence the ratchet cam wheel 153) is in phase with the hundreds drum on the shaft of which the wiper is fixed, consequently the hundreds belt on the large indicator is also in phase with the hundreds drum on the small indicator, notwithstanding the fact that in any period the said hundreds drum may have turned through many more revolutions than has the corresponding ratchet cam wheel 153. The gears 148 to 151 are preferably so selected that the cam wheel 153 completes a single revolution whenever gear wheel 148 completes a single revolution. The units gear wheel 148A (see Fig. 2) which corresponds to wheel 148 is furnished with two pawls 165 (similar to pawl 159) because the units drum 20 has twenty spaces thereon. As a consequence the units transmission gears 166 are so selected that the units ratchet cam wheel 167 performs a complete revolution when the gear 148A performs a half revolution.

Although the pawls such as 159 are preferably mounted on gear wheels such as 148 forming part of gear trains which include the driven elements of slipping clutches and gear wheels such as 151, it will be appreciated that the pawls may be mounted on any form of wheel or disc which is continuously urged to rotate by suitable drive mechanism, provided that a driving urge is also communicated to a rotatable member corresponding to gear such as 151, and provided also that the pawls such as 159 and the pegs such as 154 are maintained truly in phase.

The switches 145—146 for the circuits of the thousands and ten-thousands indicator belt magnets are repetitively closed by ratchet cam wheels 168 which are the same as those (167 or 153) already referred to in connection with the units, tens, and hundreds drives. The thousands and ten thousands ratchet cam wheels 168 are rotated by gear wheels 169 (similar to wheel 153) meshing drive pinions 170 adapted for rotation by slipping clutches 80. These drive pinions 170 are meshed by the gear wheels 79 whereby motion is imparted to the thousands small indicator drum from the hundreds drum, and whereby motion is imparted to the ten-thousands drum from the thousands drum, consequently the thousands and ten-thousands ratchet cam wheels 168 are rotated by the corresponding slipping clutches whenever the corresponding small indicator drums (23 and 24) are rotated, and as these drives include no over-running devices the movements of the thousands and ten-thousands large indicator belts are, at all times, in step with those of the corresponding small indicator drums.

The slipping clutches such as 80 for transmitting the drum movements to the ratchet cam wheels may be mounted on a common shaft 171 which is driven by worm wheel 172 and pinion 173 at a selected low speed through suitable gearing from the main gear wheel 48.

In order to reduce likelihood of a misreading, the totals appearing on the large indicator belts show blanks at the figure windows of higher order than that actually reached by the total, instead of one or more ciphers; for example, when the total is "315" the windows show "315" instead of "00315."

To provide for this effect the large indicator belts 102 are provided with eleven divisions, the blank space 103 being interposed between the "0" and "1." Also, all of the ratchet cam wheels which operate the magnet circuit switches (145—146) on the adding unit, are furnished with an additional tooth 174 positioned between the teeth corresponding to "0" and "1" (see mainly Figs. 3, 6 and 7).

When a total is being accumulated on the small indicator, a single transaction, of one hundred betting units for example, moves the hundreds drum 22 through one-tenth of a revolution to show say an "8" in place of the previously shown "7." This action correspondingly enables the ratchet cam wheel 153 to be moved through one-tenth of a revolution, thereby normally causing one closure of the related switch 145—146 so that the hundreds belt in the display unit is moved to show an "8" in place of a "7." When, however, a particular belt is to be moved directly from "0" to "1" as is the case when the belt is actively participating in the ordinary display of a total or an expanding total, the related cam wheel, by moving through its usual one-tenth of a revolution, by reason of the extra tooth 174, will effect two energizing magnet circuit closures and therefore the associated belt magnet receives two impulses and the belt is not halted on the blank position. When, however, the small indicator is reset to zero prior to the commencement of a betting run, the belts will also show a series of zeros and consequently all of the spring leaves 157 will lie between the "0" teeth and the "blank" teeth 174 of the cam wheels as shown in Fig. 3. It is then necessary, in order to move the belts to "blank" position, to move all the ratchet cam wheels through one-twentieth of a revolution in order to effect a single closure of all the magnet circuits through the agency of the blank teeth 174. As previously stated, the pegs 154 to 156 enable the ratchet cams to be rotated somewhat ahead and independently of their driving wheels 151. The ratchet cams may then be rotated ahead of their gear wheels 151 by one twentieth of a revolution in the following manner. The ratchet cams are provided with an extra driving peg 175. These extra pegs are all axially aligned when the ratchet cam wheels are all in zero position (as in Fig. 3) and they are then closely positioned to radial lever arms 176 keyed on a common spindle 177 having a crank arm 178 thereon (see Figs. 2 and 11) whereby said spindle may be part rotated (by a manually operated pull-rod 179 and a press button 180, or otherwise). The range of rotational movement through which the spindle 177 may be moved is restricted by peg 156 and it is such that the radial lever arms 176 are enabled to advance the ratchet cam wheels through one-twentieth of a revolution (as in Fig. 6) thus changing the indicator belts from "zeros" to "blanks." When betting commences, the several indicator belts will continue to show blanks until they are called upon to show figures by an impulse transmitted to any one of the ratchet cam driving gears such as 151. Such an impulse commences as a movement of wiper 147 (see Fig. 6) ahead of the tail 161. The pinion 150 then causes the tail to catch up with the wiper (as in Fig. 7) and will also cause the peg 154 on the gear to catch up with the cam peg 155 by one twentieth of a revolution, and then carry it on for a further twentieth thus bringing the ratchet cam to the position shown in Fig. 7 and changing the blank space on the particular belt to a "1."

When the total number of betting units wagered on a particular competitor in a particular event, arrives at an order of thousands, the figure displayed by the units belt, or even the tens or hundreds belts, ceases to be significant. The present invention provides mechanism whereby the figures displayed by the mentioned low order belts may be held at zero either permanently or until the betting run approaches finality or otherwise as may be required. To accomplish the effect just referred to (see mainly Figs. 1 and 11 to 13), the units, tens and hundreds ratchet cam driving gears 181, 182 and 151 respectively, each have a peg 183 thereon. Each of these pegs has a stop lever in the form of a bell crank associated therewith. These stop levers may be moved to lie in the path of the pegs 183 and thereby halt and obstruct the gears 181, 182 or 151 when they and their associated ratchet cams are in zero position.

The tens stop lever consists of an obstructing arm 184 fixed on a fulcrum shaft 185, and a finger piece 186 also fixed on shaft 185. A tension spring 187 tends at all times to hold the stop lever in the non-obstructing position shown by full lines in Fig. 12. The finger piece carries a stub 188 which is adapted to be engaged and held in the position shown by dotted lines in Fig. 12, by a latch 189 freely mounted on shaft 190 and having a loading spring 191.

The hundreds stop lever consists of an obstructing arm 192 and a finger piece 193. Arm 192 and finger piece 193 are fixed on a tubular shaft 194 which is freely revoluble on fulcrum shaft 185. In all other respects this arrangement is the same as the tens arrangement.

The units stop lever has its two arms 195 and 196 fixed on a short tubular shaft 197 which is freely revoluble on fulcrum shaft 185, and in all other respects this arrangement is the same as the tens arrangement. Stops 198 are fixed on shaft 185 to prevent endwise movement of the shafts 194 and 197.

A master lever is provided whereby the individual stop levers may be simultaneously moved to non-obstructive position, whereupon the gear wheels 181, 182 and 151 may be again rotated by the slipping clutches, and the over-running drives enabled forthwith to adjust the display unit belts into true correspondence with the small indicator.

The master lever consists of a hand-piece 199 and a pair of arms 200 all of which are fixed to the shaft 190 which is freely revoluble in bearings 201. The arms 200 carry a lift bar 202. This lift bar lies just below the three latches such as 189, and the master lever is loaded by spring 203. A stop 204 is fixed on shaft 190 to limit rotation thereof. When the hand-piece 199 is depressed against the force of the loading spring 203, the bar 202 raises the latches such as 189 and thereby releases the stop levers.

In operation, the small indicator registers incoming transactions at the same rate as they are made, and the stop arms such as 53 working in conjunction with the ratchet wheels such as 51 ensure accurate advancement of the small indicator drums. The small indicator drum shafts rotate the wipers such as 147 which in turn permit relatively slow rotation of the gear wheels such as 148 and halt or slow down those wheels truly in phase with the small indicator drums. Rotation of wheels such as 148 is kinetically reproduced in the large indicator belts, and the speed of the latter is selected to suit the size thereof. This speed may be varied simply by varying the speed of rotation of the slipping clutches 130, and the frequency of the figure changes of the belts may be varied by varying the speed of rotation of the slipping clutches such as 80.

Although the small indicator is described herein as consisting of a plurality of counting elements which are drums having figures inscribed thereon, it will be clear that the adding unit and the display unit would operate and co-operate effectively in the absence of said drums, as it is the amount of turning imparted to the shafts on which the units, tens and hundreds drums are fixed, and the amount of turning imparted to the gears such as 79 which mesh with the gears such as 811 fixed to the thousands and ten-thousands drums, which actually constitute a registered count. Consequently the term "counting element" as used hereafter is intended to apply to a rotatable member on which adding unit counts are registered, irrespective of whether that member includes, carries or meshes with a drum having numbers thereon. Similarly the term "small indicator" is intended to mean a group of said rotatable members. It is, of course, preferable that drums such as 20 to 24 be included in order to facilitate resetting operations and for convenience of operatives generally.

As the large indicator belts may be rotated at any selected slow speed, they may be replaced by drums which carry gear teeth meshing gear pinions mounted on or replacing the drive pulleys such as 106. As, however, such drums would be cumbersome if large size figures are to be displayed, it is preferable to employ belts to secure compactness and light weight. The term "figure element" as used herein is intended to apply equally to display unit belts or drums, and "large indicator" is intended to mean a group of said figure elements and means for supporting them.

The mechanism described and illustrated herein represents a preferred embodiment of the invention, and there may be several alterations therein without departing from the essence thereof. By way of example, the release wipers need not be fixed on a counting element as illustrated, but may be gear driven by such an element. Also, the release wipers need not be of the form shown, provided they each consist of a member which rotates at the same speed as its associated counting element and always remains in phase therewith. Again, the release pawls which coact with the release wipers may be formed otherwise than in the manner shown, provided they enable the related wipers to override them and provided they are unable to override the wipers.

It is stated herein that the large indicator belts may be rotated at any selected slow speed. While this statement is correct, it requires qualification to the extent that the selected speed must not be so slow that energizing impulses are received by the magnets 143 at such a rate that the belts are unable to complete a figure change in the time between successive impulses. In other words, the selected belt speed may be as low as desired provided the speed selected for the friction clutches (such as 80) in the adding unit, is such that successive closures of the contacts 145—146 may only occur at intervals which are longer than that in which the belts are able to complete a figure change.

It will be appreciated; (a) that the small indicator and the large indicator may consist of or comprise counting elements and figure elements respectively, in greater or lesser number than five; (b) that over-riding release wipers and release pawls, whereby the movements of the counting elements so control slow running drive mechanism that the figure elements are actuated to display numbers in correspondence with the total accumulated in said counting elements, may be associated with or applied to one or more of the said counting elements and its or their related figure elements; (c) that a blank space and means for optionally exhibiting it need not be arranged for in respect of all the figure elements; and (d) that means for maintaining exhibition of a "0" while a total is accumulating may be associated with one or more of the figure elements.

If desired, two or more display units (situated at various points on a race course for example) may be operated from a single adding unit, by serially wiring the figure element magnet circuits of the several display units to the switches 145—146 on the adding unit.

The invention herein described may be applied to an integrating and total displaying mechanism for the exhibition of a grand total of all transactions effected in respect of all the competitors in a particular event. Such an application of the invention may be operated by summing the totals appearing on the large or small indicators into a grand total adding unit having a grand total display unit associated therewith. These grand total units may be similar in all respects to the adding and display units described herein.

We claim:

1. Totalizator integrating and total displaying mechanism which includes a counting element, a gear train, means whereby actuation of said train is governed by movements of said counting element, driving means which at all times of operation urge actuation of said gear train, a ratchet cam wheel adapted for rotation by a member of said gear train, a pair of switch contacts closable by said cam wheel, a figure element having a blank space thereon, means responsive to a closure of said contacts whereby said figure element is caused to effect a figure change, devices whereby said ratchet cam wheel may be part rotated independently of said gear train, and a tooth on said cam wheel whereby operation of said devices enables said tooth to effect a closure of said contacts.

2. Mechanism according to claim 1, which also includes a spring loaded stop lever and a peg on said cam wheel whereby said gear train may be obstructed and halted when the figure element displays zero, a spring loaded latch and a stub on said lever to retain said stop lever in obstructing position, and means for releasing said latch from said stub.

3. Totalizator integrating and total displaying mechanism which includes a counting element, a figure element, a gear train, means whereby actuation of said train is governed by movements of said counting element, means responsive to movements of said gear train for actuating said figure element, a spring loaded stop lever whereby said gear train may be obstructed and halted when the figure element displays zero, a spring loaded latch and a stub on said lever to retain said stop lever in obstructing position, and means for releasing said latch from said stub.

4. Totalizator integrating and total displaying mechanism which consists of a small indicator comprising units, tens, hundreds, thousands and ten-thousands rotatable drums, means for accumulating a count on said drums by rotation thereof, a release wiper fixed relative to each of said units, tens and hundreds drums, a release pawl associated with each of said wipers, gear wheels which carry said pawls, a gear wheel fixed to each of said thousands and ten-thousands drums; and in respect of each of said gear wheels, a gear train meshed with the gear wheel, a slipping clutch having its driven element enmeshed with said gear train, a ratchet cam wheel, coacting driving pegs on said cam wheel and one member of said gear train, contacts closable by said cam wheel, an electro-magnet, means whereby a closure of said contacts effects an energization of said magnet, a pivotally mounted spring-loaded latch armature associated with said magnet, a stop adapted to coact with said armature, a figure element, a driving member for said figure element whereon said stop is mounted, a slipping clutch drive connected with said driving member, and means for driving both said slipping clutches.

5. Totalizator integrating and total displaying mechanism comprising a small indicator consisting of a plurality of movable counting elements, means for accumulating a count of transactions in said small indicator at substantially the same variable rate as that at which said transactions may be effected, a display unit which includes a large indicator and mechanism able to actuate the figure elements thereof, and means for controlling said figure element actuating mechanism in order that said figure elements may display a count accumulated in said small indicator; said controlling means in the case of at least one of said counting elements and a figure element related thereto, comprising, latch devices associated with said figure element actuating mechanism, drive mechanism which when released for operation is instrumental in effecting disengagement of said latch devices, and release means for said drive mechanism comprising a release wiper which is rotatable by said counting element at a speed which bears an unvarying ratio relative to the variable operative speed of said counting element, a release pawl which is unable to over-ride said wiper but which may be repeatedly overtaken and over-ridden thereby, and a wheel which carries said pawl and which is rotatable by said drive mechanism.

6. Totalizator integrating and total displaying mechanism comprising a small indicator consisting of a plurality of movable counting elements, means for accumulating a count of transactions in said small indicator at substantially the same variable rate as that at which said transactions may be effected, a display unit which includes a large indicator and mechanism for actuating the figure elements thereof, and means for controlling said figure element actuating mechanism in order that said figure elements may display a count accumulated in said small indicator; said controlling means in the case of at least one of said counting elements and a figure element related thereto; comprising, electromagnetically releasable latch devices associated with said figure element actuating mechanism, a switch which on closing is instrumental in energizing said devices, constant speed drive mechanism which when released is able to effect closures of said switch, and release means for said drive mechanism comprising a release wiper which is rotatable by said counting element at a speed which bears an unvarying ratio relative to the variable operative speed of said counting element, a release pawl which is unable to over-ride said wiper but which may be repeatedly overtaken and over-ridden thereby, and a wheel which carries said pawl and which is rotatable by said constant speed drive mechanism.

7. Totalizator integrating and total displaying mechanism comprising a small indicator consisting of a plurality of rotatable counting elements, means for accumulating a count of transactions in said small indicator at substantially the same variable rate as that at which said transactions may be effected, a display unit which includes a large indicator and mechanism for actuating the figure elements thereof, and means for controlling said figure element actuating mechanism in order that said figure elements may display a count accumulated in said small indicator; said controlling means in the case of at least one of said rotatable counting elements and a figure element related thereto, comprising, electro-magnetically releasable latch devices associated with said figure element actuating mechanism, a switch which on closing is instrumental in energizing said devices, constant speed drive mechanism including a gear train which when released is able to effect closures of said switch, and release means for said drive mechanism comprising a release wiper which is fixed relative to said rotatable counting element, a release pawl which is unable to over-ride said wiper but which may be repeatedly overtaken and over-ridden thereby, and a gear wheel which carries said pawl and which is enmeshed with said gear train.

8. Totalizator integrating and total displaying mechanism according to claim 7 in which mechanism for actuating a figure element includes a drive pulley and drive means which at all times of operation urge rotation of said pulley, and in which electromagnetically releasable latch devices associated with said figure element actuating mechanism comprise a stop which is mounted on said pulley and is rotatable therewith, a spring loaded pivoted latch whereof a portion is able to lie in the circular movement path of said stop, and an electromagnet whereof said latch constitutes the armature.

9. Totalizator integrating and total displaying mechanism according to claim 7 in which a switch which on closing is instrumental in energizing said electromagnetically releasable latch devices, consists of a pair of contacts one of which is movable towards and from the other of said contacts, and in which drive mechanism able to effect closures of said switch comprises a ratchet cam wheel having teeth adapted to effect contact making and breaking movements of said movable contact, gearing able to transmit rotary movement to said ratchet cam wheel, and drive means which at all times of operation urge rotation of said gearing.

10. Totalizator integrating and total displaying mechanism which includes a counting element furnished with means for the rotation thereof in such manner that figure changes due to said rotation may be effected at a variable speed ranging from zero figure changes per minute up to some maximum number of figure changes per minute, a figure element furnished with actuating and controlling means responsive to movements of said counting element whereby said figure element is enabled to display the same figure as said counting element without the figure change speed of said figure element exceeding a selected uniform speed which is less than the maximum figure change speed of said counting element; said actuating and controlling means comprising a release wiper fixed relative to said counting element, a release pawl which is unable to over-ride said wiper but which may be repeatedly overtaken and over-ridden thereby, a gear wheel which carries said pawl, a gear train enmeshed with said gear wheel, constant speed driving means which at all times of operation urge actuation of said gear train, a ratchet cam wheel adapted for rotation by a member of said train, a pair of switch contacts closable by said ratchet cam wheel, and means responsive to a closure of said contacts whereby said figure element is enabled to effect a figure change.

11. Totalizator integrating and total displaying mechanism according to claim 10 in which the means responsive to a closure of said contacts comprise an electromagnet, a pivotal spring loaded latch constituting the armature of said electromagnet, a rotatable member drive connected to said figure element, a stop on said member able to abut said latch, and means which a all times of operation urge rotation of said ro tatable member.

GEORGE ALFRED JULIUS.
AWDRY FRANCIS JULIUS.